(12) United States Patent
Lee

(10) Patent No.: US 6,204,884 B1
(45) Date of Patent: Mar. 20, 2001

(54) MULTISYSTEM TELEVISION WHICH IS USABLE AS A MONITOR OF A PERSONAL COMPUTER AND A METHOD THEREOF

(75) Inventor: Kab-Keun Lee, Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/007,068

(22) Filed: Jan. 14, 1998

(30) Foreign Application Priority Data

Jan. 14, 1997 (KR) ........................................ 97-882

(51) Int. Cl.$^7$ ............................ H04N 5/46; H04N 3/27; G09G 5/04

(52) U.S. Cl. .......................... 348/555; 348/554; 345/154

(58) Field of Search .................. 348/10, 554, 555, 348/556, 557, 725, 552, 706, 446; 455/3.2, 133, 142; 345/132, 154; 315/399; H04N 5/46, 5/44

(56) References Cited

U.S. PATENT DOCUMENTS

| | | | | |
|---|---|---|---|---|
| 4,581,646 | * | 4/1986 | Kubodera | 348/706 |
| 4,684,987 | * | 8/1987 | Tsutsui | 348/543 |
| 4,962,427 | * | 10/1990 | Lunn et al. | 348/555 |
| 4,996,590 | * | 2/1991 | Okamotoet | 358/74 |
| 5,021,719 | * | 6/1991 | Arai et al. | 315/364 |
| 5,068,732 | * | 11/1991 | Satoh | 348/748 |
| 5,115,312 | * | 5/1992 | Shim | 358/140 |
| 5,136,398 | * | 8/1992 | Rodriguez-Cavazos et al. | 348/445 |
| 5,283,653 | * | 2/1994 | Citta | 348/725 |
| 5,283,819 | * | 2/1994 | Glick et al. | 379/90 |
| 5,329,211 | * | 7/1994 | Sasaki et al. | 315/371 |
| 5,359,367 | * | 10/1994 | Stockill | 348/552 |
| 5,394,171 | * | 2/1995 | Rabii | 345/213 |
| 5,424,780 | * | 6/1995 | Cooper | 348/428 |
| 5,469,220 | * | 11/1995 | Kumada | 348/529 |
| 5,557,342 | * | 9/1996 | Eto et al. | 348/706 |
| 5,559,549 | * | 9/1996 | Hendricks et al. | 348/6 |
| 5,596,374 | * | 1/1997 | Sumiyoshi et al. | 348/673 |

(List continued on next page.)

FOREIGN PATENT DOCUMENTS

| | | | | |
|---|---|---|---|---|
| 405210360 | * | 8/1993 | (JP) | G09G/3/36 |
| 407007683 | * | 1/1995 | (JP) | H04N/5/44 |
| 408202321 | * | 8/1996 | (JP) | G09G/5/00 |
| 410136282 | * | 5/1998 | (JP) | H04N/5/45 |
| 410285490 | * | 10/1998 | (JP) | H04N/5/45 |

Primary Examiner—Thomas G. Black
Assistant Examiner—Uyen Le
(74) Attorney, Agent, or Firm—Staas & Halsey LLP

(57) ABSTRACT

A multisystem TV which is usable as a monitor of a personal computer (PC). The multisystem television includes an NTSC signal processor for separating an NTSC broadcasting signal into a luminance signal and a chrominance signal and generating double-scanned original color signals; a digital broadcasting signal processor for decoding a DBS (Direct Broadcasting Satellite) broadcasting receiving signal and an HD (High Definition) broadcasting receiving signal and converting a signal corresponding to a current viewing mode out of the decoded HD signal, the decoded DBS signal and an external HD signal into a display type; a switching circuit for selectively generating one of a PC monitor signal received from a PC, an output signal of the digital broadcasting signal processor and an output signal of the NTSC signal processor according to the current viewing mode; a video output circuit for adjusting picture quality of a signal generated from the switching circuit so as to be supplied to a picture tube; a controller for controlling the signal processing of the NTSC signal processor, digital broadcasting signal processor and video output circuit, the switching of the switching circuit, and the deflection of the picture tube, according to the current viewing mode; and a synchronous processor for processing a synchronizing signal generated from the switching circuit and supplying the processed signal to the video output circuit and the controller.

13 Claims, 3 Drawing Sheets

U.S. PATENT DOCUMENTS

| | | | |
|---|---|---|---|
| 5,610,663 | * | 3/1997 | Nan et al. .............................. 348/554 |
| 5,673,087 | * | 9/1997 | Choi et al. ........................... 348/511 |
| 5,675,390 | * | 10/1997 | Schindler et al. ................... 348/552 |
| 5,734,437 | * | 3/1998 | Back .................................... 348/563 |
| 5,754,015 | * | 5/1998 | Nagaoka et al. ..................... 315/411 |
| 5,777,520 | * | 7/1998 | Kawakami .......................... 331/1 R |
| 5,781,250 | * | 7/1998 | Jun ...................................... 348/706 |
| 5,805,148 | * | 9/1998 | Swamy et al. ....................... 345/509 |
| 5,838,383 | * | 11/1998 | Chimoto et al. .................... 348/553 |
| 6,008,795 | * | 12/1999 | Nakamura ........................... 345/154 |
| 6,037,994 | * | 3/2000 | Bae ...................................... 348/510 |
| 6,046,721 | * | 4/2000 | Song et al. .......................... 345/132 |
| 6,124,893 | * | 9/2000 | Stapleton ............................. 348/441 |

* cited by examiner

MULTISYSTEM TELEVISION WHICH IS USABLE AS A MONITOR OF A PERSONAL COMPUTER AND A METHOD THEREOF

BACKGROUND OF THE INVENTION

1. Field of the Invention

The present invention relates to a television (TV), and more particularly, to a TV which is usable as a monitor of a personal computer (PC), and a method thereof.

2. Description of the Related Art

To use a TV for watching NTSC (National Television System Committee) broadcasting as a monitor of a PC or to watch DBS (Direct Broadcasting Satellite) broadcasting, additional equipment is required.

Referring to FIG. 1, a DBS receiver 102 and a PC/NTSC converter 104 are additionally connected to a general TV 100 coupled to an NTSC receiving antenna 101. Then the TV 100 can perform a general broadcasting receiving function, a DBS receiving function and a PC monitor function. That is, to watch the DBS broadcasting, the DBS receiver 102 is installed at the TV 100 to convert a satellite broadcasting signal into a signal suitable for NTSC RF (Radio Frequency) standard. The converted signal is applied to the TV 100 through its antenna input terminal 103. Alternatively, a base band composite video signal generated from the DBS receiver 102 may be applied to the TV through its external input terminal. To perform the PC monitor function, there is needed the PC/NTSC converter 104 for converting a PC monitor signal received from a terminal 106 into an NTSC signal which can be displayed on the TV 100. If the output of the PC/NTSC converter 104 is connected to the external input terminal of the TV 100, the PC monitor signal can be displayed on the TV 100.

However, even if the DBS receiver 102 for watching such DBS broadcasting is installed, a digital DBS signal is converted into an analog NTSC signal and analog signal processing is implemented. During such processes, the characteristic of the DBS signal may be deteriorated. Further, if the TV is used as the PC monitor, the resolution, 800×600 for example, of the output of the PC monitor is lowered to the resolution, 640×480 for example, of the NTSC system. Therefore, it is difficult to receive future HDTV (high definition TV) broadcasting.

SUMMARY OF THE INVENTION

It is an object of the present invention to provide a multisystem TV which can be used as a PC monitor and enable viewing of the NTSC broadcasting, DBS broadcasting and HDTV broadcasting.

Additional objects and advantages of the invention will be set forth in part in the description which follows and, in part, will be obvious from the description, or may be learned by practice of the invention.

To achieve the above and other objects, there is provided a multisystem TV including an NTSC signal processor for separating an NTSC broadcasting signal into a luminance signal and a chrominance signal and generating double-scanned original color signals; a digital broadcasting signal processor for decoding a DBS (Direct Broadcasting Satellite) broadcasting receiving signal and an HD (High Definition) broadcasting receiving signal and converting a signal corresponding to a current viewing mode out of the decoded HD signal, the decoded DBS signal and an external HD signal into a display type; a switching circuit for selectively generating one of a PC monitor signal received from a PC, an output signal of the digital broadcasting signal processor and an output signal of the NTSC signal processor according to the current viewing mode; a video output circuit for adjusting picture quality of a signal generated from the switching circuit so as to be supplied to a picture tube; a controller for controlling the signal processing of the NTSC signal processor, digital broadcasting signal processor and video output circuit, the switching of the switching circuit, and the deflection of the picture tube, according to the current viewing mode; and a synchronous processor for processing a synchronizing signal generated from the switching circuit and supplying the processed signal to the video output circuit and the controller.

BRIEF DESCRIPTION OF THE DRAWINGS

The advantages and features of the present invention will become better understood by reference to the following detailed description of the preferred embodiment when considered in conjunction with the accompanying drawings in which.

DETAILED DESCRIPTION OF THE PREFERRED EMBODIMENT(S)

In the following description, numerous specific details are set forth to provide a more thorough understanding of the present invention. It will be apparent, however, to one skilled in the art, that the present invention may be practiced without these specific details. In other instances, well-known functions or constructions are not described in detail since they would obscure the present invention in unnecessary detail.

Figure 1:
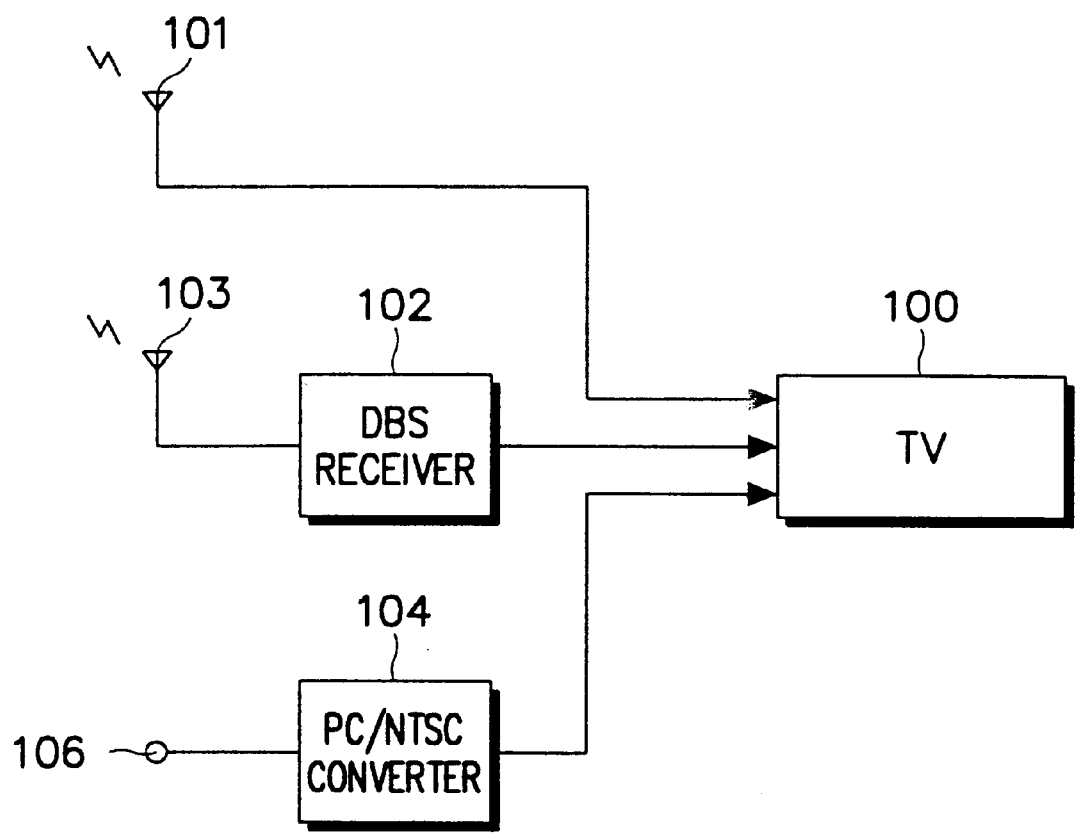
FIG. 1 is a block diagram of a conventional multisystem TV.
Figure 2:
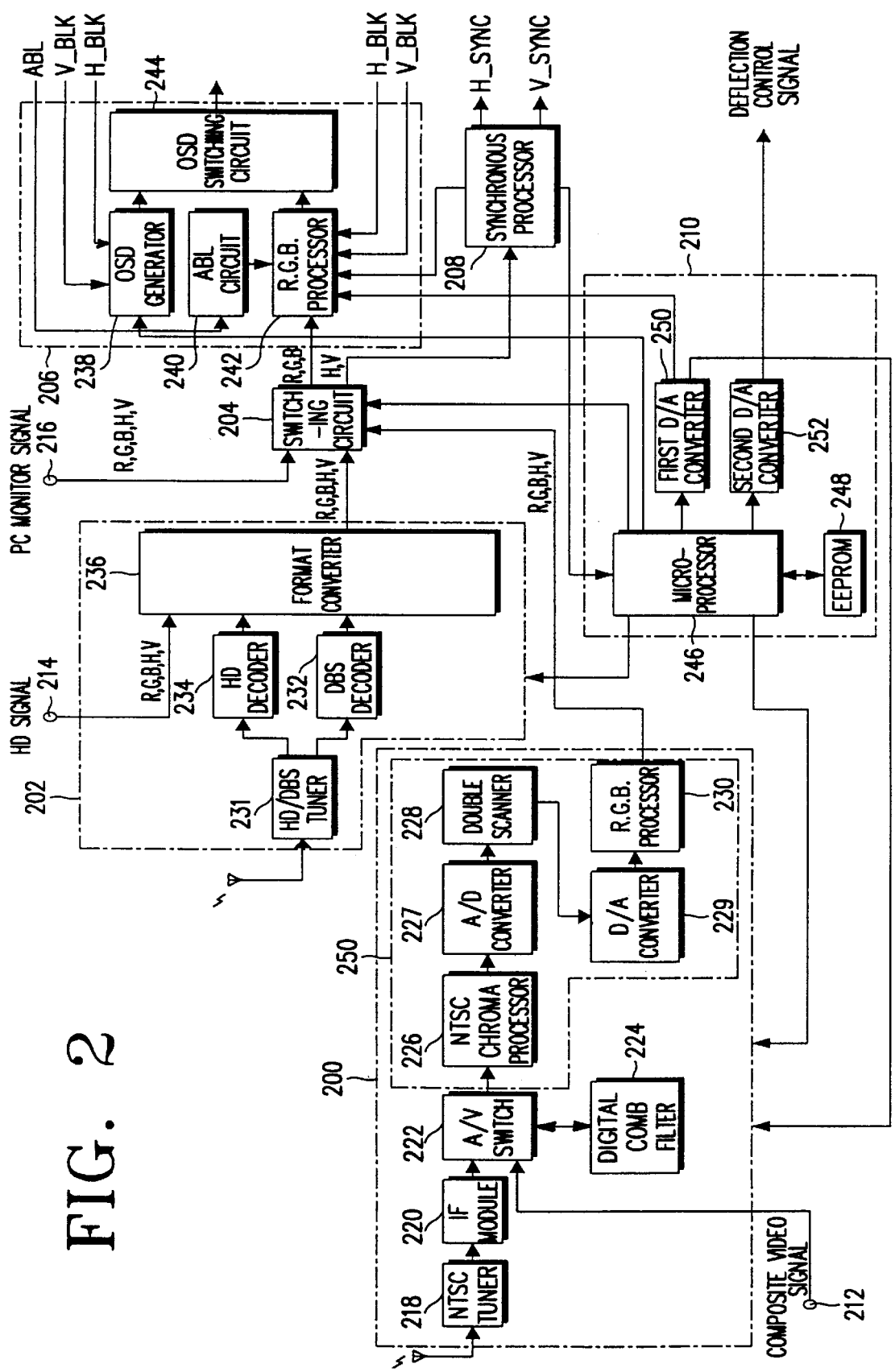
FIG. 2 is a block diagram of a multisystem TV in accordance with a preferred embodiment of the present invention.

Referring to FIG. 2, a multisystem TV according to the present invention includes an NTSC signal processor 200, a digital broadcasting signal processor 202, a switching circuit 204, a video output circuit 206, a synchronous processor 208 and a controller 210. For these constructions, typically used circuits and integrated circuits are employed.

A microprocessor 246 of the controller 210 controls the operation of the NTSC signal processor 200, digital broadcasting signal processor 202, switching circuit 204 and video output circuit 206, according to a current viewing mode among 4 viewing modes of an NTSC broadcasting receiving mode, a DBS broadcasting receiving mode, an HDTV broadcasting receiving mode and a PC monitor mode, and controls the overall operation of a multisystem display unit.

The NTSC signal processor 200 includes an NTSC tuner 218, an intermediate frequency (IF) module 220, an audio/video (A/V) switch 222, a digital comb filter 224 and a double scanning circuit 250. The double scanning circuit 250 has an NTSC chroma processor 226, an analog-to-digital (A/D) converter 227, a double scanner 228, a digital-to-analog (D/A) converter 229, and an R.G.B. processor 230. The NTSC signal processor 200 separates an NTSC RF signal received through an antenna or a composite video signal received through an external input terminal 212 into a luminance signal and a chrominance signal. Thereafter, the NTSC signal processor 200 converts the separated signals into color difference signals and double-scans the color difference signals.

In more detail, the NTSC tuner 218 selects an NTSC broadcasting receiving signal by the control of the controller 210 and generates an IF signal. The IF module 220 processes the IF signal generated from the NTSC tuner 218 and generates a base band video signal. The A/V switch 222 selects either the base band video signal generated from the IF module or the composite video signal received through the external input terminal 212. The external composite video signal is an NTSC signal. The digital comb filter 224 connected to the A/V switch 222 separates a signal selected by the A/V switch 222 into the luminance signal and the chrominance signal. The separated luminance signal and chrominance signal are applied to the NTSC chroma processor 226. In this case, the composite video signal received through the external input terminal 212 may be a super video signal. Since the luminance signal of the super video signal and the chrominance signal thereof have already been separated, if the A/V switch selects the super video signal of the external composite video signal, the super video signal is directly supplied to the NTSC chroma processor 226 without passing through the digital comb filter 224. The NTSC chroma processor 226 processes signals generated from the A/V switch 222 and converts the processed signals into the color difference signals, that is, Y, R-Y and B-Y. The A/D converter 227 converts the color difference signals Y, R-Y and B-Y into digital signals. The double scanner 228 double-scans the color difference signals of the digital form. The D/A converter 229 converts the double-scanned digital color difference signals into double-scanned analog color difference signals. The R.G.B. processor 230 converts the double-scanned analog color difference signals into original color signals R, G and B. The original color signals R, G and B are applied to the switching circuit 204 together with vertical and horizontal synchronizing signals H and V. By the double scanning conversion, horizontal and vertical deflection frequencies of 15.75 KHz–60 KHz are converted into 31.5 KHz–60 KHz.

The digital broadcasting signal processor 202 includes an HD/DBS tuner 231, an HD decoder 234, a DBS decoder 232 and a format converter 236. The digital broadcasting signal processor 202 decodes a DBS broadcasting receiving signal and an HD broadcasting receiving signal, and converts a signal corresponding to a current viewing mode out of an external HD signal received through an external input terminal 214, the decoded HD signal and the decoded DBS signal into a display type by the control of the controller 210.

The HD/DBS tuner 231 selects a signal corresponding to the current viewing mode out of the HD broadcasting receiving signal and the DBS broadcasting receiving signal. The HD decoder 234 decodes the HD signal selected by the HD/DBS tuner 231 and generates a digital HD signal. The DBS decoder 232 decodes the DBS signal selected by the HD/DBS tuner 231 and generates a digital DBS signal. The format converter 236 converts a signal corresponding to the current viewing mode out of the HD signal received through the external input terminal 214, and the digital HD signal and the digital DBS signal decoded from the HD and DBS decoders 234 and 232 into the display type by the control of the controller 210. The format converter 236 includes a format converter IC, a memory, a timing generator, and a D/A converter. The external HD signal is supplied to the format converter 236 together with the original color signals R, G and B and the horizontal and vertical synchronizing signals H and V. An example of the display format is that the horizontal frequency is 45 KHz and the vertical frequency is 60 Hz. The converted original color signals R, G and B and horizontal and vertical synchronizing signals H and V are applied to the switching circuit 204.

The switching circuit 204 generates a signal corresponding to the current viewing mode out of a signal generated from the NTSC signal processor 200, a PC monitor signal received from a PC through a PC monitor input terminal 216 and a signal generated from the format converter 236 by the control of the controller 210. The PC monitor input terminal 216 uses an RS-232C interface. The PC monitor signal received through the PC monitor input terminal 216 is supplied to the switching circuit 204 together with the original color signals R, G and B and the horizontal and vertical synchronizing signals H and V.

The video output circuit 206 includes an OSD (On Screen Display) generator 238, an ABL (Automatic Beam Limit) circuit 240, an R.G.B. processor 242 and an OSD switching circuit 244. The video output circuit 206 adjusts picture quality of the signals R, G and B generated from the switching circuit 204 by the control of the controller 210 so as to be supplied to a picture tube (not shown).

The OSD generator 238 generates an OSD signal in synchronization with horizontal and vertical blanking signals H_BIK and V_BLK applied from a deflection circuit of the picture tube by the control of the controller 210. The R.G.B. processor 242 receives the original color signals R, G and B from the switching circuit 204, the horizontal and vertical blanking signals H_BLK and V_BLK from the deflection circuit of the picture tube and a synchronizing signal from the synchronous processor 208, and adjusts the picture quality such as contrast, brightness and white balance with respect to the original color signals R, G and B by the control of the controller 210. The ABL circuit 240 controls the ABL of a signal generated from the R.G.B. processor 242 according to an ABL signal applied from the deflection circuit of the picture tube. The OSD switching circuit 244 switches signals generated from the OSD generator 238 and the R.G.B. processor 242 and supplies the switched signal to the picture tube.

The synchronous processor 208 processes the horizontal and vertical synchronizing signals H and V generated from the switching circuit 204 so as to be converted into horizontal and vertical synchronizing signals H_SYNC and V_SYNC of a constant form, and supplies a clamp signal to the R.G.B. processor 242. The synchronous processor 208 also supplies the horizontal and vertical synchronizing signals H and V to the microprocessor 246 of the controller 210.

The controller 210 includes the microprocessor 246, an EEPROM (Electrically Erasable and Programmable Read Only Memory) 248, and first and second D/A converters 250 and 252. The controller 210 controls the signal processing of the NTSC signal processor 200, the digital broadcasting signal processor 202 and the video output circuit 206, the switching of the switching circuit 204, and the deflection of the picture tube by the microprocessor 246 according to the current viewing mode. The EEPROM 248 stores control data, that is, picture quality control data, deflection control data and other data according to each viewing mode of the general broadcasting receiving mode, the DBS broadcasting receiving mode, the HDTV broadcasting receiving mode and the PC monitor mode. The microprocessor 246 controls the operation of each mode by reading the control data from the EEPROM 248. The first and second D/A converters 250 and 252 are connected to the microprocessor 246 through an IIC bus. The first D/A converter 250 converts digital data into an analog signal in order to adjust the picture quality and supplies the analog signal to the NTSC signal processor 200 and the R.G.B. processor 242. The second D/A converter 252 converts the deflection control data generated from the microprocessor 246 into an analog deflection control signal and supplies the analog deflection control signal to the deflection circuit of the picture tube.

The operation of 4 viewing modes of the multisystem TV having the above-described configuration will be described hereinafter in detail.

In the NTSC broadcasting receiving mode, a desired channel is selected from the NTSC tuner 218 by the control of the microprocessor 246. The IF signal is applied to the IF module 220. The base band video signal is supplied to the A/V switch 222. If it is desired to receive the NTSC composite video signal from the exterior, the external composite video signal is applied to the A/V switch 222 through the external input terminal 212. The A/V switch 22 selectively generates the base band signal generated from the IF module 222 or the external composite video signal received through the external input terminal 212. The signal generated from the A/V switch 222 is separated into the luminance signal and the chrominance signal by the digital comb filter 224. The NTSC chroma processor 226 processes and converts the luminance and chrominance signals into the color difference signals Y, R-Y and B-Y. The A/D converter 227 converts the color difference signals Y, R-Y and B-Y into the digital signals. The double scanner 228 double-scans the digital color difference signals. The double-scanned digital color difference signals are converted into the double-scanned analog signals by the D/A converter 229. The doubled analog color difference signals are supplied to the R.G.B. processor 230 and then converted into the original color signals R, G and B. The original color signals R, G and B are supplied to the switching circuit 204 together with the horizontal and vertical synchronizing signals H and V. The original color signals R, G and B and the horizontal and vertical synchronizing signals H and V are selected by the switching of the switching circuit 204. The original color signals R, G and B are applied to the R.G.B. processor 242, and the horizontal and vertical synchronizing signals H and V are supplied to the synchronous processor 208.

The synchronous processor 208 converts the horizontal and vertical synchronizing signals H and V into the horizontal and vertical synchronizing signals H_SYNC and V_SYNC of a constant form, and supplies the clamp signal to the R.G.B. processor 242. The synchronous processor 208 provides the horizontal and vertical synchronizing signals H and V to the microprocessor 246 as a reference signal for judging an input signal when the multisystem TV operates as the PC monitor mode. The R.G.B. processor 242 adjusts the picture quality of the contrast, brightness and white balance according to the signal applied from the first D/A converter 250. The output of the R.G.B. processor 242 is applied to the OSD switching circuit 244. The control of the ABL is performed by the ABL circuit 240. The OSD signal corresponding to the horizontal and vertical frequencies is generated from the OSD generator 238 and supplied to the OSD switching circuit 244. Signals generated from the OSD switching circuit 244 are the original color signals R, G and B including OSD information and applied to a cathode of the picture tube through final output amplifying terminals. Therefore, the NTSC broadcasting or an image by external input is displayed on a screen.

In the DBS broadcasting receiving mode, the DBS broadcasting signal is supplied to the HD/DBS tuner 231 and decoded by the DBS decoder 232. The decoded DBS signal is converted into the display format by the format converter 236 according to the control of the microprocessor 246. The original color signals R, G and B and the horizontal and vertical synchronizing signals H and V are applied to the switching circuit 204. Thereafter, the same operation as the NTSC broadcasting receiving mode is performed and the DBS broadcasting is displayed on the screen. Therefore, there is no need for an additional satellite broadcasting receiver. Further, since the digital DBS signal is directly analog-processed without being converted into an analog NTSC signal format, there is no degradation in the characteristic of the DBS signal.

In the HDTV broadcasting receiving mode, the HDTV broadcasting signal is supplied to the HD/DBS tuner 231 and decoded by the HD decoder 234. The decoded HDTV signal is converted into the display format by the format converter 236 according to the control of the microprocessor 246. The original color signals R, G and B and the horizontal and vertical synchronizing signals H and V are applied to the switching circuit 204. Thereafter, the same operation as the NTSC broadcasting receiving mode is implemented and the HDTV broadcasting is displayed on the screen.

In the PC monitor mode, the PC monitor signal is supplied to the switching circuit 204 from the PC through the PC monitor input terminal 216. The original color signals R, G and B are applied to the R.G.B. processor 242, and the horizontal and vertical synchronizing signals H and V are applied to the synchronous processor 208. Thereafter, the same operation as the NTSC broadcasting receiving mode is performed and the PC monitor screen is displayed.

Figure 3:
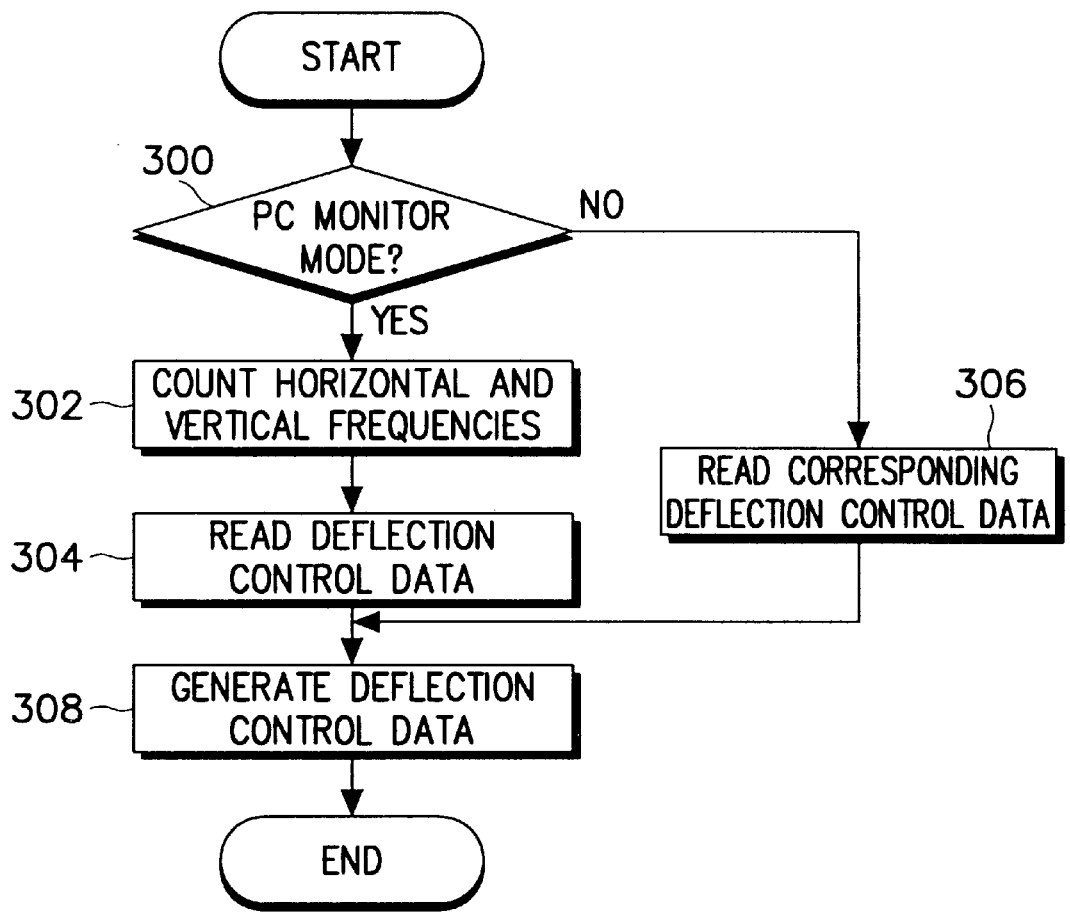
FIG. 3 is a flow chart showing a deflection control data output process executed by a microprocessor illustrated in FIG. 2 according to a viewing mode.

Referring to FIG. 3, there is shown a deflection control data output process executed by the microprocessor 246 according to the current viewing mode of the TV.

In the PC monitor mode, the deflection control data corresponding to the horizontal and vertical frequencies of the PC monitor signal is generated. In the NTSC broadcasting or other modes, the deflection control data of a fixed value suitable for corresponding broadcasting is generated.

At step 300, the microprocessor 246 checks whether the current viewing mode is the PC monitor mode. If not, for example, if the current viewing mode is the NTSC broadcasting receiving mode, the microprocessor 246 reads the deflection control data fixed as a value of the NTSC broadcasting receiving mode from the EEPROM 248 at step 306. If the current viewing mode is the PC monitor mode, the microprocessor 246 counts the horizontal and vertical frequencies of the horizontal and vertical synchronizing signals applied from the synchronous processor 208 at step 302. The microprocessor 246 reads the deflection control data corresponding to the counted frequencies from the EEPROM 248 at step 304. The microprocessor 246 generates the deflection control data through the second D/A converter 252 at step 308.

As described above, the multisystem TV can view the NTSC, DBS and HDTV broadcasting by one apparatus without degrading the picture quality. Moreover, the multisystem TV is usable as the PC monitor. Hence, the multisystem TV according to the present invention is convenient to use and economical. Since the composite video signal is converted into the color difference signal and double-scanned, the frequency band is limited and thus the resolution is improved.

While the invention has been shown and described with reference to a certain preferred embodiment thereof, it will be understood by those skilled in the art the various changes in form and details may be made therein without departing from the spirit and scope of the invention as defined by the appended claims.

What is claimed is:

1. A multisystem television which is usable as a monitor of a personal computer (PC), comprising:

an NTSC (National Television System Committee) signal processor to separate an NTSC broadcasting signal into a luminance signal and a chrominance signal and generating double-scanned original color signals;

a digital broadcasting signal processor to decode a DBS (Direct Broadcasting Satellite) broadcasting receiving signal and an HD (High Definition) broadcasting receiving signal, and converting a signal corresponding to a current viewing mode out of the decoded HD signal, the decoded DBS signal and an external HD signal into a display type;

a switching circuit to selectively generate one of a PC monitor signal received from the PC, an output signal of said digital broadcasting signal processor and an output signal of said NTSC signal processor according to the current viewing mode, and to output a synchronizing signal of the selectively generated one signal;

a video output circuit to adjust picture quality of the selectively generated one signal from said switching circuit so as to be supplied to a picture tube;

a controller to control the signal processing of said NTSC signal processor, digital broadcasting signal processor and video output circuit, the switching of said switching circuit, and the deflection of the picture tube, according to the current viewing mode; and a synchronous processor to process the synchronizing signal generated from said switching circuit and supplying the processed synchronizing signal to said video output circuit and said controller.

2. A multisystem television as set forth in claim 1, wherein, if the current viewing mode is a PC monitor mode, said controller judges horizontal and vertical frequencies of said synchronizing signal and controls the deflection of the picture tube so as to correspond to the horizontal and vertical frequencies.

3. A multisystem television as set forth in claim 2, wherein said NTSC signal processor comprises:

an NTSC tuner to select said NTSC broadcasting receiving signal under control of said controller and generating an intermediate frequency signal;

an intermediate frequency module to process said intermediate frequency signal generated from said NTSC tuner and generating a base band video signal;

an audio/video switch to select said base band video signal generated from said intermediate frequency module or a composite video signal received from the exterior by the control of said controller;

a digital comb filter to separate the signal selected by said audio/video switch into said luminance signal and said chrominance signal; and a double scanning circuit to double-scan said luminance and chrominance signals generated by said digital comb filter and output from said audio/video switch and generating double-scanned original color signals.

4. A multisystem television as set forth in claim 3, wherein said double scanning circuit comprises:

an NTSC chroma processor to process said luminance and chrominance signals output from said audio/video switch and generating color difference signals;

an analog-to-digital converter to convert said color difference signals into digital color difference signals;

a double scanner to double-scan said digital color difference signals;

a digital-to-analog converter to convert the double-scanned digital color difference signals into double-scanned analog color difference signals; and an R.G.B. processor to convert the double-scanned analog color difference signals into the double-scanned original color signals.

5. A multisystem television as set forth in claim 3, wherein horizontal and vertical deflection frequencies of the double-scanned color signals are limited to 31.5–60 KHz by the double scanning conversion.

6. A multisystem television as set forth in claim 4, wherein horizontal and vertical deflection frequencies of the double-scanned color signals are limited to 31.5–60 KHz by the double scanning conversion.

7. A multisystem television as set forth in claim 3, wherein said digital broadcasting signal processor comprises:

an HD/DBS tuner to select one of the HD broadcasting receiving signal and the DBS broadcasting receiving signal according to the current viewing mode;

an HD decoder to decode said HD broadcasting signal if selected by said HD/DBS tuner and generating a digital HD signal;

a DBS decoder to decode said DBS broadcasting signal if selected by said HD/DBS tuner and generating a digital DBS signal; and a format converter to convert one of said digital HD signal, said digital DBS signal, and an external HD signal received as a digital signal from the exterior of the multisystem television according to the current viewing mode and generating analog original color signals of the display type.

8. A multisystem television as set forth in claim 6, wherein said video output circuit comprises:

an on-screen display generator to generate an on-screen display signal by control of said controller;

an R.G.B. processor to adjust picture quality with respect to the one signal generated from said switching circuit;

an automatic beam limit circuit to control an automatic beam limit of the signal processed from said R.G.B. processor; and an on-screen display switching circuit to select one of the signals generated from said on-screen display generator and said R.G.B. processor and supply the one selected signal to the picture tube.

9. A method of displaying PC signal data from a PC on a television having a picture tube, comprising:

determining horizontal and vertical frequencies of horizontal and vertical synchronizing signals of the PC signal by counting the horizontal and vertical synchronization signals;

determining deflection control data of the picture tube based upon the counted horizontal and vertical frequencies; and transmitting the deflection control data to the picture tube.

10. A method as claimed in claim 9, wherein said step of determining deflection control data comprises the steps of:

pre-storing a plurality of deflection control values corresponding to different horizontal and vertical frequencies;

reading the deflection control value corresponding to the horizontal and vertical frequencies of the horizontal and vertical synchronizing signals, as the deflection control data.

11. A method as claimed in claim 10, further comprising the steps of:

determining if the television is in a PC monitor mode or another mode; and reading a fixed value as the deflection control value if the television is in the another mode.

12. A television to display a PC (personal computer) signal from a personal computer and an other signal from a non-PC source, comprising:

a switch to selectively enable transmission of the PC signal and the other signal, according to a current viewing mode;

a video output circuit to process the one selected signal from said switch; and a controller to determine deflection control data based on counting horizontal and vertical frequencies of a synchronizing signal associated with the PC signal if the PC signal is the one selected signal, and to determine the deflection control data as a fixed value if the other signal is the one selected signal.

13. A television having a picture tube and usable as a monitor for a personal computer, the personal computer having a first output signal set including a video signal, a horizontal sync signal and a vertical sync signal, the television comprising:

a radio frequency receiver which receives a television signal and outputs a second signal set including a video signal, a horizontal sync signal and a vertical sync signal;

a circuit which selects one of the first and second signal sets, outputs the selected video signal and outputs the horizontal and vertical sync signals corresponding to the selected video signal;

a video output circuit which adjusts the picture quality of the selected video signal in response to a quality control signal; and a controller which:

counts the outputted horizontal and vertical sync signals and outputs a first deflection control signal based on the counts of the outputted vertical and horizontal sync signals and a first stored value in response to the selection of the first signal set, or outputs a second deflection control signal based on a second stored value in response to the selection of the second signal set; and outputs the quality control signal to the video output circuit based on the selected signal set.

\* \* \* \* \*